(12) United States Patent
Albers et al.

(10) Patent No.: US 6,259,528 B1
(45) Date of Patent: Jul. 10, 2001

(54) EXTENDING RLG LIFETIME BY MAINTAINING LOW LEVEL OXYGEN IMPURITY BACKGROUND

(75) Inventors: Steven C. Albers, Coon Rapids; Timothy J. Callaghan, Roseville; Lawrence B. Ehlert, Maple Grove; Joseph E. Killpatrick, St. Anthony Village, all of MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/216,237

(22) Filed: Dec. 18, 1998

(51) Int. Cl.[7] .............................. G01J 4/00; H01S 3/097; H01S 3/083

(52) U.S. Cl. .................... 356/459; 356/459; 356/369; 372/87; 372/88; 372/94

(58) Field of Search .................. 372/94, 87, 88; 356/459, 369

(56) References Cited

U.S. PATENT DOCUMENTS

| | | | |
|---|---|---|---|
| 4,926,437 | * | 5/1990 | Ford ........................................ 372/87 |
| 5,052,012 | * | 9/1991 | Norvell .................................. 372/87 |
| 5,867,269 | * | 2/1999 | Albers et al. ......................... 356/350 |

* cited by examiner

Primary Examiner—Frank G. Font
Assistant Examiner—Armando Rodriguez
(74) Attorney, Agent, or Firm—Kris T. Fredrick

(57) ABSTRACT

Plasma is placed in ring laser gyro blocks to create laser beams for the operation of the ring laser gyro. The plasma is doped with a small portion of material that allows the ring laser gyro to operate for a long period of time.

7 Claims, 1 Drawing Sheet

EXTENDING RLG LIFETIME BY MAINTAINING LOW LEVEL OXYGEN IMPURITY BACKGROUND

BACKGROUND OF THE INVENTION

In ring laser gyros it is important for obvious reasons to have a gyro with a long lifetime. In the past, the goal was to create an ultra pure helium and neon gas environment inside the laser cavity of a ring laser gyro. However, it has been discovered that a slight oxygen background extends the life of the ring laser gyro by reducing degradation caused by the plasma. In present ring laser gyros 1 shown in FIG. 1, helium neon plasma 12 is introduced into a ring laser gyro block 2 to create lasing in the ring laser gyro 1 which in turn creates laser beams 16 in the ring laser gyro 1. Mirrors 8 are placed at the ends of the ring laser gyro block 2 to keep the laser beams 16 traveling in the block 2 for ring laser gyro operation.

One of the key factors for a long life in ring laser gyros 1 is that the cathode 7 and mirrors 8 used in the ring laser gyro 1 have a long life. The plasma environment is important in preventing the degradation of the cathode 7 and mirrors 8 and extending the life of the cathode 7 and mirrors 8. As stated previously, it has been discovered that a low level of oxygen in the plasma environment extends the life of the cathode 7 and mirrors 8 and thus, the life of the ring laser gyro 1. However, it has been difficult if not impossible to create a slight oxygen background because there are multiple oxygen sinks inside the laser cavity of the ring laser gyro.

It would be beneficial to create an environment for the cathode 7 and mirrors 8 so that the cathode 7 and mirrors 8 would not deteriorate and have a long life. As a result of a longer life for the cathode 7 and the mirrors 8, the life of the ring laser gyro 1 would be longer as well.

SUMMARY OF THE INVENTION

For the operation of ring laser gyros, plasma is placed in the ring laser gyro blocks to create laser beams. Mirrors are placed in the ring laser gyro block to keep the laser beams traveling for continued operation of the ring laser gyro. To keep the mirrors operating for a long period of time, the plasma is doped with a low level of oxygen to create an environment that will not deteriorate the cathode and mirrors, but ensure long life operation. As a result, the life of the ring laser gyro will be long as well.

DETAILED DESCRIPTION OF THE PRESENT INVENTION

Figure 1:
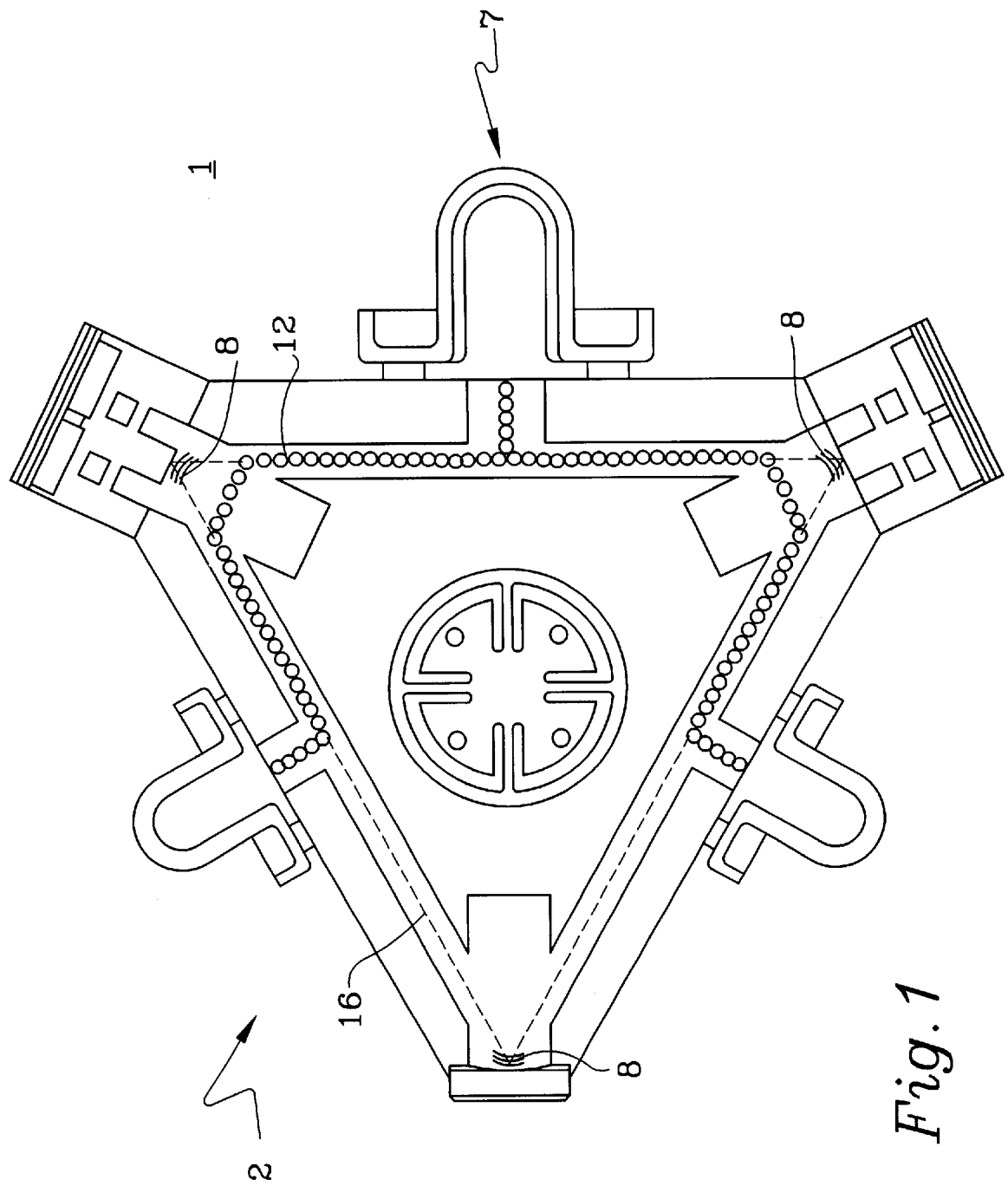
FIG. 1 shows a cross sectional view of a ring laser gyro.

The present invention provides a large enough oxygen source to overcome the oxygen sinks already existing in the laser cavity of the ring laser gyro 1. The present invention dopes the HeNe plasma 12 with oxygen so that a greater amount of oxygen exists within the cavity and thus, extending the life of the cathode 7 and the mirrors 8 and thus, the life of the ring laser gyro 1. 0.1 torr of oxygen would be doped into the HeNe. However, this value is used for example purposes only since it does not matter what the value is as long as the oxygen level (nominally a micro torr) is sufficient to compensate damages caused by the plasma. The difference between the values is attributed to the fact that some oxygen will be lost due to practical realities (for example cathode pumping) since it is impossible to retain the exact amount of oxygen without some loss. However, the micro torr or more amount would allow for an adequate source of oxygen to exist to improve the environment of the cathode 7 and mirrors 8 and extend the life of the ring laser gyro 1. Again the value that is initially doped will vary with the size of the gyro 1 and other factors.

The invention has been described herein in detail in order to comply with the Patent Statutes and to provide those skilled in the art with the information needed to apply the novel principles and to construct and use such specialized materials and components as are required. However, it is to be understood that the invention can be carried out by specifically different materials and components, and that various modifications, both as to the processing details and operating procedures, can be accomplished without departing from the scope of the invention itself.

The embodiments of the invention in which an exclusive property or right is claimed are defined as follows:

1. A ring laser gyro, comprising:
   a ring laser gyro block having a plurality of passageways to form a closed path;
   gas, doped with oxygen, permanently introduced into the passageways of the ring laser gyro block to create two counterpropagating beams in said passageways; and
   a plurality of mirrors placed in said ring laser gyro block to keep the beams traveling in the passageways.

2. The ring laser gyro of claim 1 wherein the gas is comprised of Helium and Neon.

3. The ring laser gyro of claim 1 wherein the material is 0.1 torr.

4. A method of preserving the life of a ring laser gyro, comprising the steps of:
   a) placing a plurality of anodes on the ring laser gyro;
   b) placing mirrors at the ends of a ring laser gyro block;
   c) placing a cathode on the ring laser gyro;
   d) introducing plasma into the ring laser gyro traveling between an anode and the cathode; and
   e) maintaining a predetermined amount of oxygen near the mirrors near the plasma for the life of the ring laser gyro.

5. A method of preserving the life of a ring laser gyro, comprising the steps of:
   a) placing a plurality of anodes on the ring laser gyro;
   b) placing mirrors at the ends of a ring laser gyro block;
   c) placing a cathode on the ring laser gyro;
   d) introducing an ionized gas into the ring laser gyro traveling between an anode and the cathode;
   e) initially doping the gas at 0.1 torr;
   f) maintaining a predetermined amount of oxygen throughout the laser gyro block; and
   g) running a current from the anode to the cathode to create plasma in the ring laser gyro block.

6. The method of claim 5 wherein the amount of step f) is at least an amount needed to counteract plasma damages.

7. The method of claim 6 wherein the amount is at least a micro torr.

* * * * *